(12) United States Patent
Bai (10) Patent No.: US 7,129,827 B2
(45) Date of Patent: Oct. 31, 2006

(54) RESETTABLE MOTOR VEHICLE MAINTENANCE INTERVAL MONITOR BY OPERATING TIME

(76) Inventor: Hoon Bai, 28119 Ridgeforest Ct., Rancho Palos Verdes, CA (US) 90275

( * ) Notice: Subject to any disclaimer, the term of this patent is extended or adjusted under 35 U.S.C. 154(b) by 182 days.

(21) Appl. No.: 10/903,824

(22) Filed: Jul. 30, 2004

(65) Prior Publication Data

US 2005/0024195 A1 Feb. 3, 2005

Related U.S. Application Data

(60) Provisional application No. 60/491,716, filed on Aug. 1, 2003.

(51) Int. Cl.
*B60Q 1/00* (2006.01)

(52) U.S. Cl. .................. 340/438; 340/457; 340/457.4; 701/29; 701/30

(58) Field of Classification Search ................ 340/438, 340/457, 457.4
See application file for complete search history.

(56) References Cited

U.S. PATENT DOCUMENTS

| 4,910,678 A | * | 3/1990 | Kubozono et al. | ............ 701/35 |
| 4,987,403 A | * | 1/1991 | Apfel | ........................ 340/457 |
| 5,714,925 A | * | 2/1998 | Lee et al. | ................ 340/309.7 |

* cited by examiner

*Primary Examiner*—Donnie L. Crosland
(74) *Attorney, Agent, or Firm*—Jerry Noh (57) ABSTRACT

A vehicle maintenance interval monitoring system designed to alert the motor vehicle's operator of performing preventive maintenances. The system uses operation time of the vehicle as maintenance scheduling interval. The system includes a device that includes a input/output port, display unit, battery as power source, and a vibration sensor and RF antenna connected to a microprocessor. The microprocessor has a EEPROM, Flash memory, and a main processor. Various information are transmitted to the device and stored in the EEPROM by a computer. Main processor performs functions programmed into the Flash memory. This vibration sensor detects vibration and RF antenna gets a signal when the engine is on and activates counters stored in the microprocessor. The operation time of the vehicle is stored in the EEPROM for each preventive service. In operation, the microprocessor generates various maintenance alert signals at predetermined accumulated times.

16 Claims, 8 Drawing Sheets

RESETTABLE MOTOR VEHICLE MAINTENANCE INTERVAL MONITOR BY OPERATING TIME

RELATED APPLICATION

This application claims the benefit of Provisional Patent Application No. 60/491,716, filed Aug. 1, 2003. The entire contents of this provisional patent application are incorporated by reference herein.

BACKGROUND OF THE INVENTION

1. Field of the Invention

The present invention relates to vehicle maintenance reminder devices. More particularly, the present invention relates to a maintenance interval monitoring and alert system used to alert motor vehicle operators to perform certain predetermined preventive and scheduled maintenance tasks.

2. Description of the Prior Art

All vehicles require periodic services and inspection, such as engine oil change, brake inspection, tire inspection, and both minor and major tune-ups. Most service stations measure the distances driven since the last service as the frequency for these various services. However a more accurate gauge of the necessity for recommended maintenance schedule for each of these different services depends engine wear which can be measured by the time of engine usage not on the distance traveled. Also, it is difficult for the owner of a vehicle to mentally keep track of every scheduled maintenance recommended by a vehicle manufacturer. To help owners keep track of maintenance schedules, a variety of schedule monitoring devices have been developed in the prior art. These devices have modules that alert vehicle owners when he/she needs to perform scheduled maintenances.

One such device is taught by Yasuhara, in U.S. Pat. No. 4,506,337 discloses a microcomputer system for indicating when an engine lubricating oil should be exchanged once the working life of the engine lubricating oil is over. This system uses sensors for detecting engine revolutions per time and the load on the engine, and using these data and pre-defined equation, it determines when the engine oil should be changed. This system is limited in that it only deals with engine oil change service and doesn't have communication means through connection with a computer.

Bazarnik, in U.S. Pat. No. 4,612,623 discloses a tamper-resistant, running time maintenance monitor for, and method of, indicating that equipment requiring periodic preventive maintenance is due for such maintenance. This monitor uses keypads for inputting information into the device. A disadvantage of this device is the complication in inputting information using the keypad and also in the relatively large size of the device, which makes it too large for attachment onto or under the dashboard of a vehicle. Also, this device does not have communication means through connection with a computer and uses individualized access code for preventing unauthorized resetting of the device. But, this individualized usage prevents commercial use of this invention.

Muhlberger et al. in U.S. Pat. No. 4,630,027 discloses a service-interval display for motor vehicles, which generates a signal when a limiting parameter value is reached. Total fuel consumption serves as the basic parameter instead of the distance traveled, previously employed. The system uses set point value for comparison with accumulated fuel consumption and alerts the vehicle operator if the accumulated value exceeds set point value. The patent does not explain any means for inputting or resetting information in the device. Also, there is no way to communicate with external devices, such as a computer.

Moon, Sr. in U.S. Pat. No. 4,884,054 discloses a vehicle maintenance interval monitor that allows selection of mileage intervals between servicing for a number of individual maintenance requirements. The monitor is computerized and battery powered, and it keeps track of the actual date and time. The reason of using battery as power source is for keeping track of date and time after previous service. Thereafter the device uses the miles traveled that are computed by multiplying the date and time and a speed factor. When a service interval has been completed the monitor provides a suitable warning indication. The maintenance interval uses actual period of passage of time; however, this device uses passage of time regardless of whether the vehicle is in use or not.

Smith, in U.S. Pat. No. 5,499,181 discloses methods and apparatus for communicating with an occupant of a vehicle. Such method includes the steps of coupling the vehicle to a station; transferring information from the station into the vehicle; and receiving the transferred information and storing the transferred information within the vehicle. This method requires electrical and mechanical connection to the vehicle, so it needs mechanical and electrical work in connection of the device to the vehicle. Also, this device necessitates the installation of a programmable device on the vehicle or in the alternative, the user has to get an access control of electrical device that is already installed in the vehicle for the other usage. Also, the system needs the modules for reading odometer in the vehicle or for comparing current date with the due date that is inputted by a service station.

Cardillo, in U.S. Pat. No. 5,623,247 discloses an electronic device that is connected to a vehicle and programmed to alert its operator as to when to perform preventive maintenance tasks, such as engine oil changes or brake replacement. It uses actual time the vehicle or other equipments are in use as time interval indication for doing preventive maintenance task. There are two ways to install monitoring device on the motor vehicle. One way is installing it as original equipment and the other way is installing it as an aftermarket retrofit. Also, the patent suggests that the positions of the monitoring device on the car is on the dashboard or under the dashboard. The patent suggests connecting the monitoring device's electrical leads to the fuse box for activating a clocking mechanism and to the car battery for keeping its programming in the device. This means that the device does not use flash memory or EEPROM for keeping programming. And, it also need to mechanical and electrical work for connecting the electrical leads to the fuse box and battery.

Cardillo et al. in U.S. Pat. No. 5,917,408 discloses a maintenance alert device having a memory for storing information relating to the vehicle. More specifically, a housing is provided for containing the components of the device, which include a processor for performing various functions programmed into the device, and a memory connected to the processor for storing information relating to the vehicle. The invention includes a wiring harness for receiving signals including odometer information from the vehicle, but installation of this feature requires mechanical connection. The patent suggests that the present invention can be used in either of two ways for determining scheduled maintenance period, odometer reading or vehicle operating hours. The preference suggested is to use odometer instead of complete time of motor vehicle use. Also, the system needs keypad on the device for entering information into the device.

Edwards, in United States Publication No. US 2002/0080022A1 discloses a devices that uses computer for storing vehicle information, owner information, and history of previous maintenances. The computer system alerts the vehicle owner of when the recommended vehicle maintenance schedule is. The key point of this invention is that it calculates maintenance time/mileage interval using information directly from manufacturer of a particular vehicle. However, in this device there is no monitoring unit, and further this device does not have a way of measuring time/mileage that is increased after previous maintenance service for each maintenance task. Also, the invention only uses a computer for gathering user/vehicle/mileage information and display mileage and time information about next service on the screen. This means that vehicle owners have to check the computer and see whether it is time to perform the needful service or not.

While the prior art devices are somewhat useful in keeping track of a vehicle's maintenance schedule, they have several limitations and disadvantages which necessitates improvement. As such, a main object of the present invention is to provide a simple and small alert system that can let vehicle operators know that it is time to do a certain maintenance task. Another object of the present invention is to provide a monitoring device which is capable of communication with connection to a terminal at a service station. Still a further object of the present invention is to calculate exact and accurate time that the engine is in use through using a vibration sensor for detecting vibration caused by engine that is in use. Thus, the object of the present invention is to provide alerts to the operator based on the complete time that the vehicle is running. It is yet another object of the present invention to provide means through which a service station can reset parameter values of maintenances based on the condition of vehicle usage. And the service station can reset the counter value that reaches the parameter value back to zero after doing the required maintenance.

SUMMARY OF THE INVENTION

Some parts of a car including tires have wear which is directly correlated to the net mileage traveled; however, general preventive maintenance tasks including engine oil change, transmission oil change, brake inspection, minor and major tune-up are based on the complete time the motor vehicle is running. Proper periodic maintenance of a motor vehicle is emphasized by mechanics for motor vehicle longevity and for reducing long term repair costs by reducing the need for major repairs to the motor vehicle. Proper maintenance needs attention to a relatively small number of parts of the vehicle. However, items that require maintenance have different and independent time intervals for scheduled maintenance. For this reason, it is difficult for the operator of a motor vehicle to keep track of when he/she has to do required maintenance for the different items.

The present invention is designed to alert the motor vehicle's owner/operator of performing preventive maintenances when a vehicle operation time is reached to a certain predetermined set points. The monitoring system uses operation time of the vehicle instead of mileage as maintenance scheduling interval, because it is a more accurate parameter than mileage. The operation time can be used for estimating traveled mileage by multiplying average speed factor. The present invention can have multiple maintenance parameters, and each maintenance parameter has a certain predefined set point. However, these values should be different according to variety of vehicle makers, models, engine size and other vehicle options. So, the present invention includes database that contains all the above information, and suggests appropriate maintenance time interval, i.e. set point value, for each vehicle that uses the device.

In an embodiment shown in the present illustrations, the present invention consists of one chip microprocessor, input/output port, display module, vibration sensor, RF antenna, and battery as power source. In the one chip microprocessor, there are EEPROM (Electrically Erasable Programmable Read-Only Memory), Flash memory, and a main processor. Using input/output port, various information including vehicle information and set points for each needful maintenance are transmitted to the device and stored in the EEPROM by a computer in the service station. Also, a password for each service station that installs the device can be stored in the device. As such, the service station can get a benefit that keeps connection with its customers. Main processor performs various functions programmed into the Flash memory, which includes the function of increasing counters for each maintenance and checking whether these counter values reach their set points. When a connection between PC and the device is established, the main processor communicates with PC. The present invention has a vibration sensor and an RF antenna that is connected to a chip microprocessor. This vibration sensor detects vibration and the RF antenna gets signal when the vehicle engine is on. When the vehicle engine starts, the vibration sensor detects vibration and the RF antenna receives signal from the operating engine. When both the vibration sensor detects vibration and when the RF antenna receives the signal from the running engine, a counter in the one chip microprocessor is triggered. The device, therefore, can accumulate times that the vehicle is in use, not just mileage that the vehicle has traveled. These accumulated times are stored in the EEPROM for each preventive service, even if electrical power is not supplied. This device includes a display module that is can have a LED display for each maintenance task needed to be performed, but it can extend to LCD for displaying useful information about suggesting maintenance task, remaining time to needful maintenance, and other desired predetermined tasks. In the alternative, in lieu of the vibration sensor and RF antenna, in another embodiment, the present invention has an adapter for connection into the power jack (also known as phone jack or lighter jack) of an automobile to measure the operation time of the vehicle. When the vehicle engine starts, the adapter receives signal from the jack and the counter in the microprocessor is triggered.

In operation, the device generates various maintenance alert signals when accumulated times reach to the predefined set points, which is detected by the main processor in the device. After performing the necessary maintenance at a service station, the variable that has kept accumulated times for the maintenance can be re-set to zero by the computer in the service station. Through linkage with the computer in the service station, the maintenance parameter value according to the vehicle's options as mentioned above can also be changed.

DETAILED DESCRIPTION OF THE PREFERRED EMBODIMENT

Figure 1:
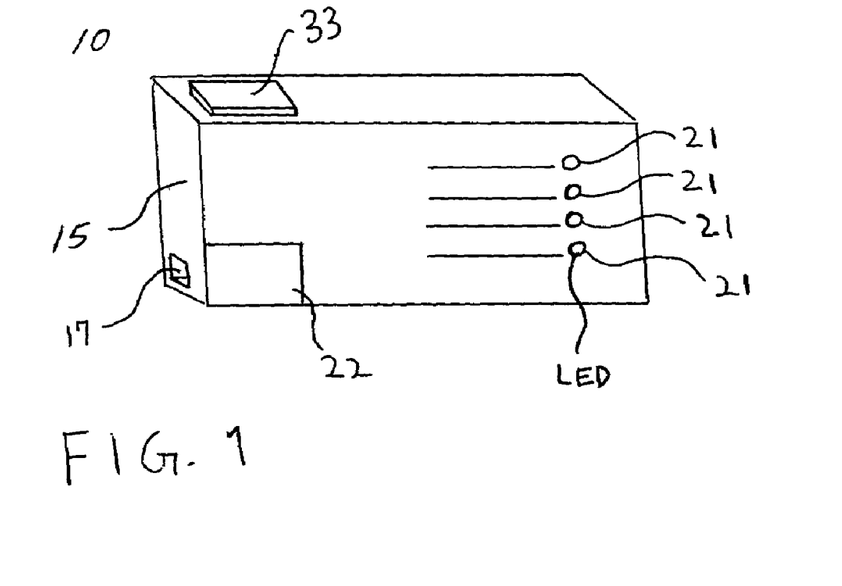
FIG. 1 is a view of an embodiment of the present invention.
Figure 1A:
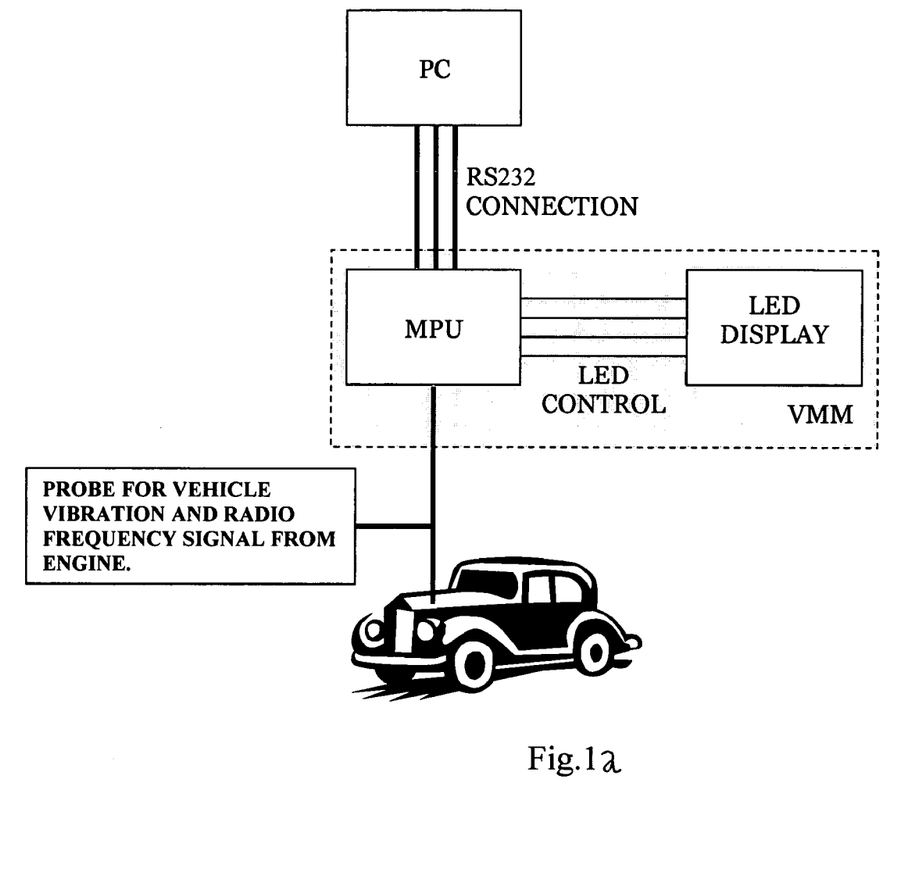
FIG. 1a is an overview of the system.

FIG. 1a describes the entire overview of VMM (Vehicle Maintenance Monitoring) system of the present invention. As shown, one of the PC (Personal Computer) serial ports is connected to the USART 17 (Universal Synchronous Asynchronous Receiver Transmitter) formed on the housing 15 of the VMM device 10. Three wires (RX, TX, and GND) are required to support the RS232 communication protocol between PC and VMM through implementing software error checking. RX stands for USART receive pin, TX for USART transmit pin, and GND for ground pin. At the setup stage, the shop user creates a password and inputs customer information such as customer name, vehicle license number, maker, model, and year of production. The customer information is saved into PC database and into the VMM and stored at FLASH memory of MPU (Micro Process Unit) so that shop user can refer to this information later when the customer visits again. After the setup is done, the connector between PC and VMM is unplugged so that the customer can leave with the installed VMM device.

The VMM device 10 as shown in FIG. 1 includes a probe device in the housing 15 with a vibration sensor 22 connected thereto for sensing vibration generated by a running vehicle when the vehicle engine is started. The VMM device 10 contains a predetermined number of counters depending on the number of services desired to be monitored by the VMM device 10. In the embodiment shown in FIGS. 1 through 11, for purposes of illustration, a VMM device 10 with four counters which are related with a corresponding specific maintenance services is described. The counters are in operation when the vibration sensor is active. These counters are stored at the EEPROM (Electrically Erasable Programmable Read-Only Memory) contained in the housing 15 of the VMM device, which is a non-volatile memory device. Data in EEPROM still remains even when the vehicle is not in operation. These four counters are updating and saving data into the EEPROM when the customer operates the vehicle. Once one of the counters hits the number that is related to a specific maintenance service, a signal is transmitted to the display unit to signal the vehicle operator. In the present embodiment shown, the display unit is in the form of a plurality of LEDs (Light Emitting Diode) with each LED corresponding to a counter in the EEPROM.

As such, when one of the counters reaches the predetermined value, the an appropriate LEDs 21 (Light Emitting Diode) formed on the housing 15 is activated so that the customer can recognizes that it is time to get the service. When one of the LED is activated, the customer should return to the shop where the VMM device 10 was installed to take care of the proper service.

When the customer comes back to the shop for the service, the shop user should plug the serial connection to the VMM device 10 and input the password that was created before. If the password is valid, the VMM device allows access to its EEPROM. With access, the shop can reset the service counter. The shop user takes care of the service that is indicated by LED device and resets the counter back to zero, and the LED will be turned off.

Figure 2:
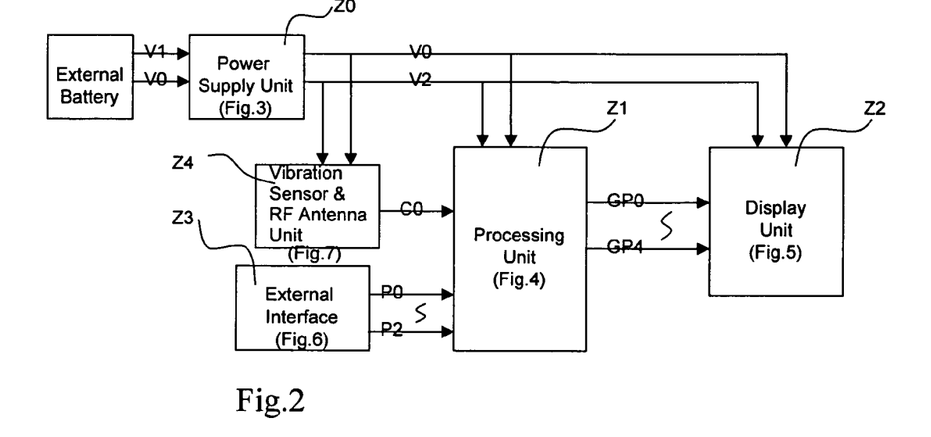
FIG. 2 is a basic block diagram for the system
Figure 3:
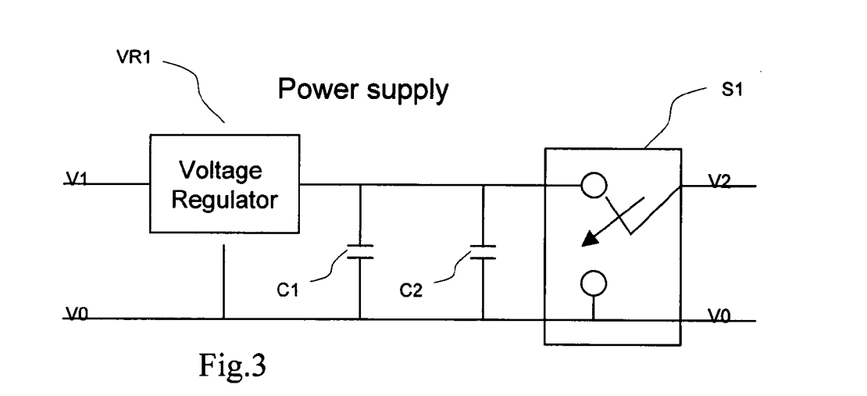
FIG. 3 is a power supply circuitry to supply the power for the system

The basic block diagram of the VMM system is shown in FIG. 2, which includes the power supply unit Z0, processing unit Z1, display unit Z2, an external interface unit Z3, and a vibration sensor unit Z4. The power supply unit Z0, contained in the housing 10, is shown in FIG.3 and it consists of a voltage regulator VR1, external power sources V1 and V0, capacitors C1 and C2, output supply power V2 to the system, and a switch S1 which selectively connects V1 and V0 to V2. External powers from a dedicated battery V1(~12V) and V0(~0V) are connected to the inputs of the voltage regulator VR1 and the output of the voltage regulator VR1 is connected to the inputs of the switch S1. Capacitors C1 and C2 are used to stabilize output voltage from the voltage regulator V3 under abrupt changes in power level. The switch S1 is used to connect the actual supply power V2 for the system to either V0 or V3 for the external reset.

Figure 4:
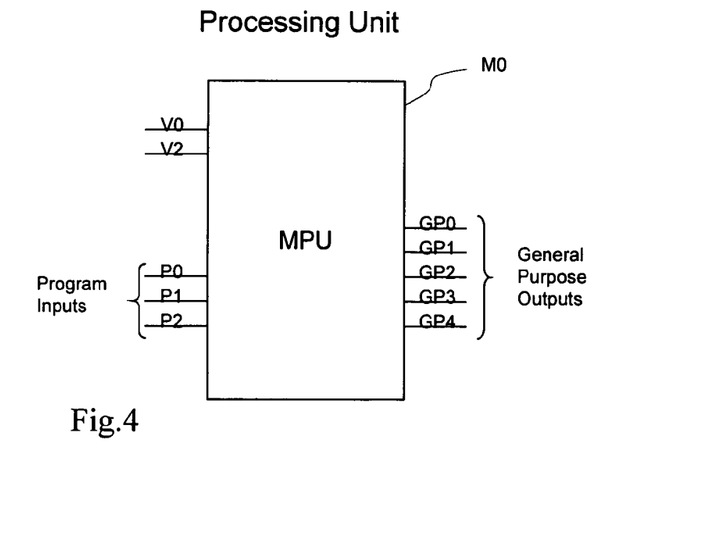
FIG. 4 is a connectivity of the processing unit in the system

FIG.4 is a processing unit Z1 contained in the housing 15. The processing unit Z1 includes a microprocessor M0, which performs required executions. The processor is powered by V0 and V2 from the power supply unit Z0 and some inputs (P0, P1, and P2) are connected to the external interface unit Z3 for the future modification of variable information inside the processor M0. The processor M0 has a general purpose output pins GP0, GP1, GP2, GP3 and GP4 are connected to the display unit Z2 formed on the housing 15.

Figure 5:
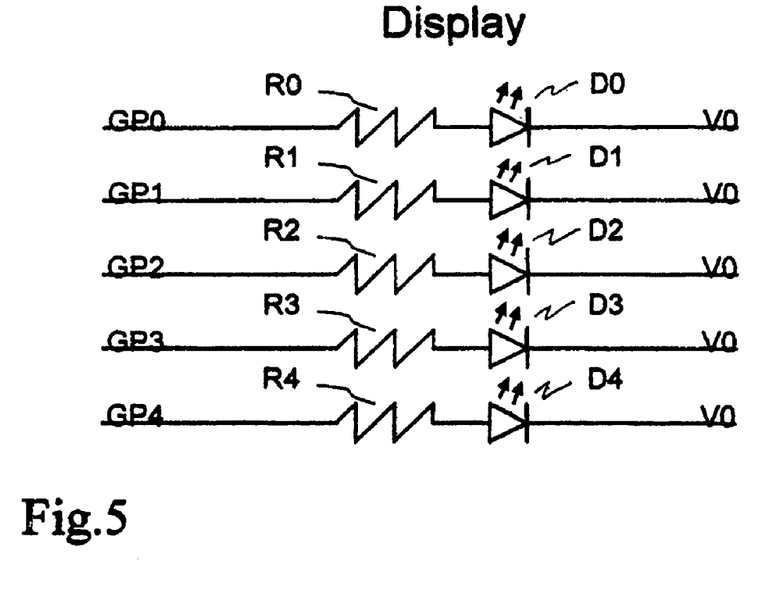
FIG. 5 is a display unit consisting of resistors and LEDs (Light emitting diodes)

FIG.5 is a display unit including LEDs D0, D1, D2, D3 and D4, which shows the status of the system. These LEDs are connected to resistors R0, R1, R2, R3 and R4 and these resistors are used to protect over current flowing into its dedicated LED. General-purpose outputs GP0, GP1, GP2, GP3 and GP4 from the processing unit Z1 are connected to each resistor to indicate the required time or cycles have passed.

Figure 6:
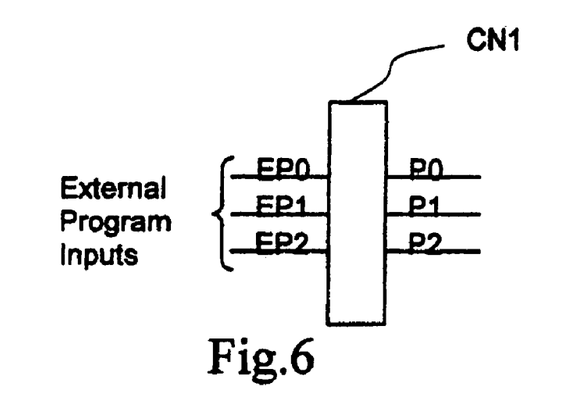
FIG. 6 is a diagram of external interfaces of the system

FIG.6 is an external interface unit Z3 and this unit enables the modification of information inside the processing unit Z1. Depending on the outputs P0, P1 and P2 which are connected to the inputs of the processing unit Z1, the information inside the processor unit is changed.

Figure 7:
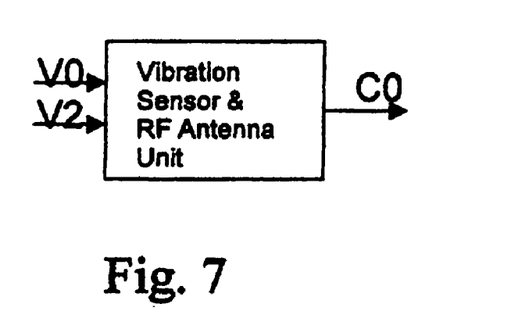
FIG. 7 is a diagram of vibration sensor and RF antenna unit.

The vibration sensor utilized for the present invention can be from one of that known in the prior art which is capable of performing the desired function. One such vibration sensor is manufactured by Measurement Specialties, Incorporated of Valley Forge, Pa. The vibration sensor Z4 provides a control signal C0 to the microprocessor. The control signal, C0, which is connected to a reset pin of the microprocessor, is used to initiate the operation of microprocessor by sensing a vibration such as the movement of a vehicle with operation of the vehicle engine. For improved vibration detection and filtering out of vibration from sources other than vehicle engine, the VMM device can also have a RF (Radio Frequency) antenna unit 33 in conjunction with the vibration sensor. The RF antenna unit is programmed to receive the predetermined signal from a running engine. One such signal can be from the sparks generated in a running engine. With the RF antenna unit working in conjunction with the vibration sensor, the counters of the processing unit will operate only when both the RF antenna unit and the vibration sensor are activated by receiving the proper signals. As such, when an engine is running, it generates vibration for the vibration sensor and sends the proper signal to the RF antenna unit at the same time, and in turn activates the signal C0 to an on state.

Figure 8:
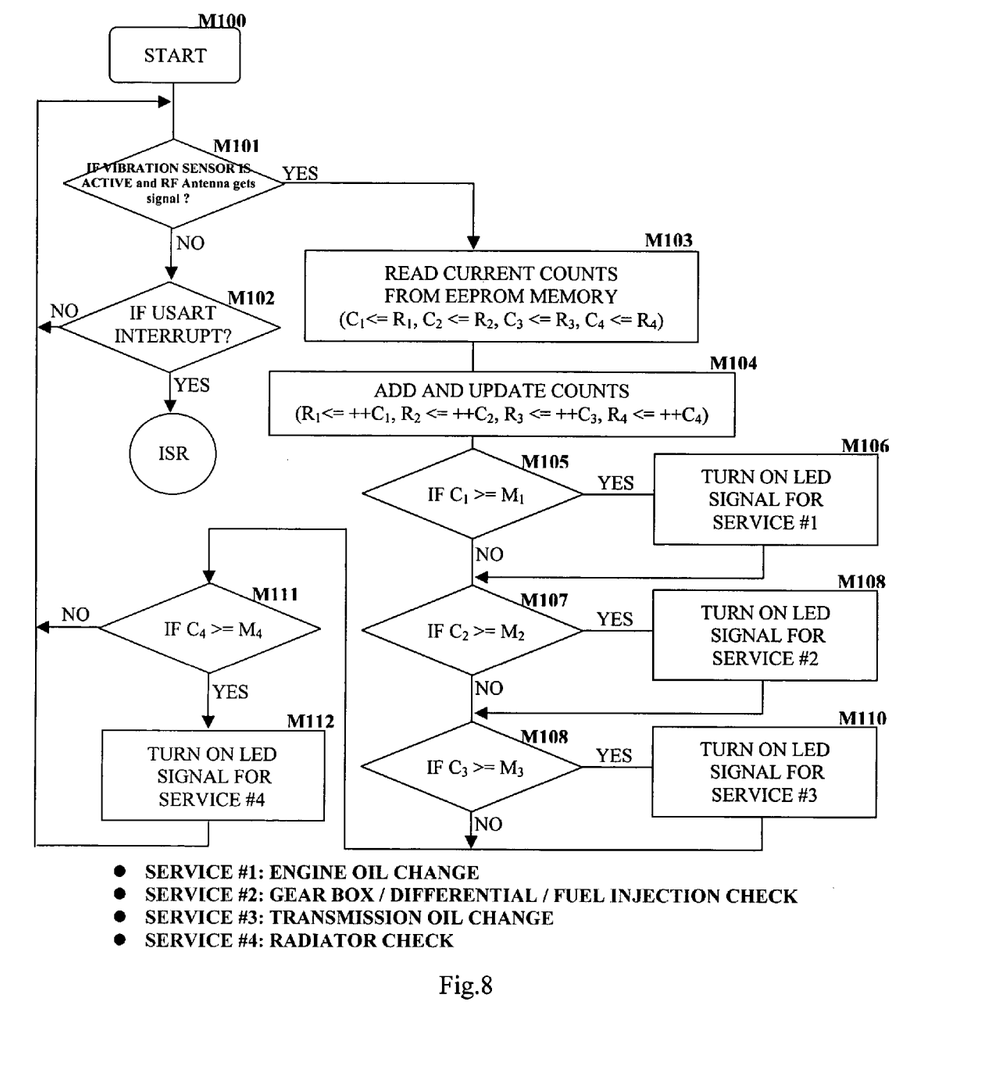
FIG. 8 is a main service check routine.

As shown in FIG. 8, the VMM device first executes the step M101, which exams the vibration of the vehicle and whether RF antenna get signal from engine start. When the vibration sensor is not active or RF antenna doesn't get signal, it checks whether the USART interrupt occurred or not, which checks whether the RX register is filled or empty at the M102. Not empty means there is data sent from the PC, which should be handled. ISR (Interrupt Service Routine) will handle the data, which will be explained later. Empty RX register means that there is no data transmitted from PC, which means that there is no connection from PC, and goes back to the step M101. When the vibration sensor is active and RF antenna is receiving signal, which means the engine is running, the counters should run. The counters are read from the EEPROM at the step M103, followed by the step M104, which increases and stores the updated counts back to the EEPROM.

After the step M104, each counter is checked to determine whether the count is equal to or greater than the pre-defined maximum counter for the appropriate service at the junctions of M105, M107, M109, and M111. When any counter ($C_i$) is equal or greater than the pre-define value ($M_i$), the VMM turns on the ith LED signal for the service i. In the illustration, each service number implies as follows:

SERVICE #1: ENGINE OIL CHANGE
SERVICE #2: GEAR BOX/DIFFERENTIAL/FUEL INJECTION CHECK
SERVICE #3: TRANSMISSION OIL CHANGE
SERVICE #4: RADIATOR CHECK

The VMM executes M106, M108, M110, and M112 when one of the junctions (M105, M107, M109, and M111) has the true value respectively. When one of junctions (M105, M107, M109, and M111) is true, which means one of LEDs is on, the customer should visit the car shop that installed the VMM device to get the proper maintenance service.

Figure 9:
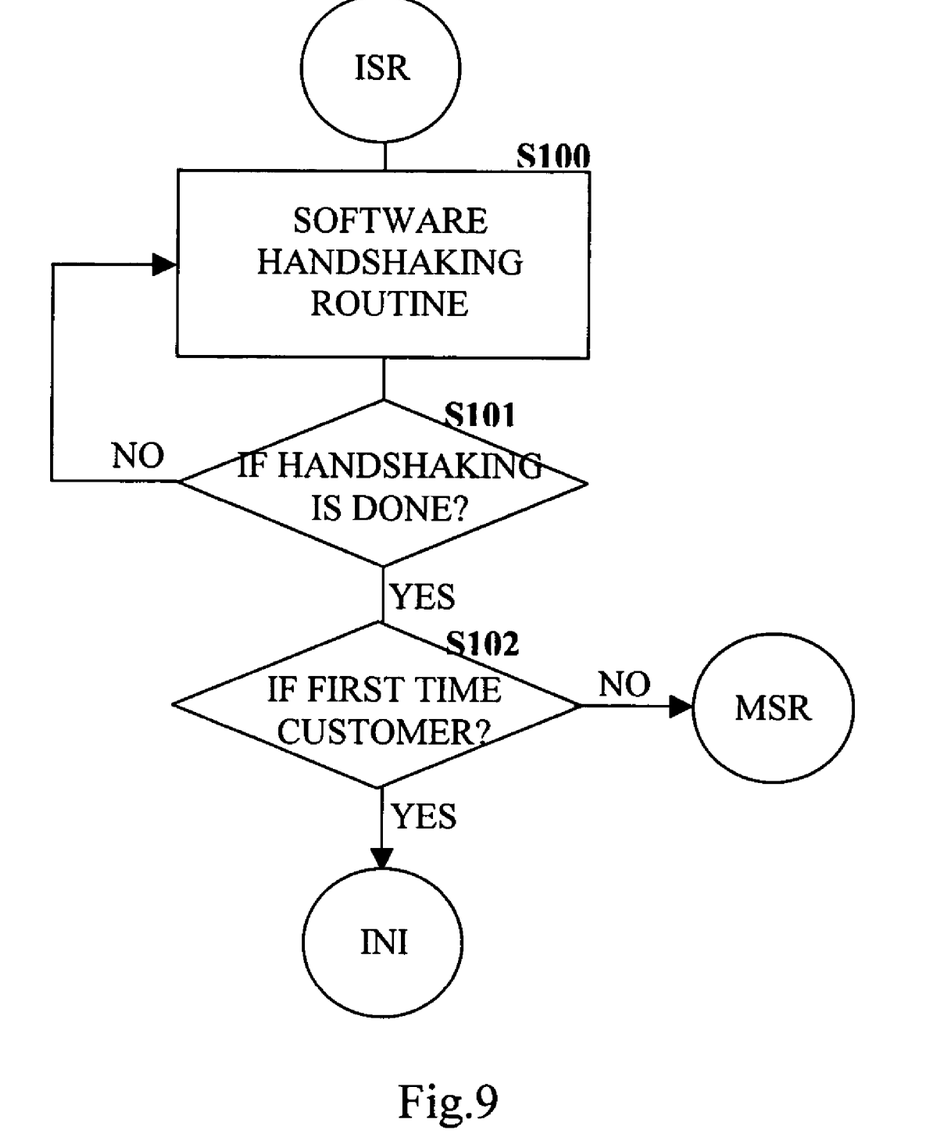
FIG. 9 is an interrupt service routine.

When the USART interrupt occurs, which indicates RX register is filled with data from PC, the VMM handles this interrupt as depicted in FIG. 9. In terms of the communication with PC, there are two cases: INI (Initial Setup Routine) and MSR (Maintenance Service Routine). INI is the case that the customer visits the shop for the first time. The shop user creates a password and stores the vehicle information, which will be explained later. MSR is the situation that the customer goes to the shop when one of LEDs is on, which means the vehicle should be examined.

At the step S100, the VMM synchronizes to the PC. For purposes of illustration, in the illustration shown, asynchronized communication is utilized because data transmission rate of PC and that of the VMM are usually different. Software handshaking routine is implemented with asynchronized communication in the module, S100. The VMM waits until the handshaking process is done at the junction S101. When it is done, the VMM decides whether this interrupt should be for the ISR or the MSR by checking the existence of the created password in the VMM memory. If there is no password created, then it should be the case of the first visit by the customer, and it goes into the INI module. Otherwise, it should go into the MSR module.

Figure 10:
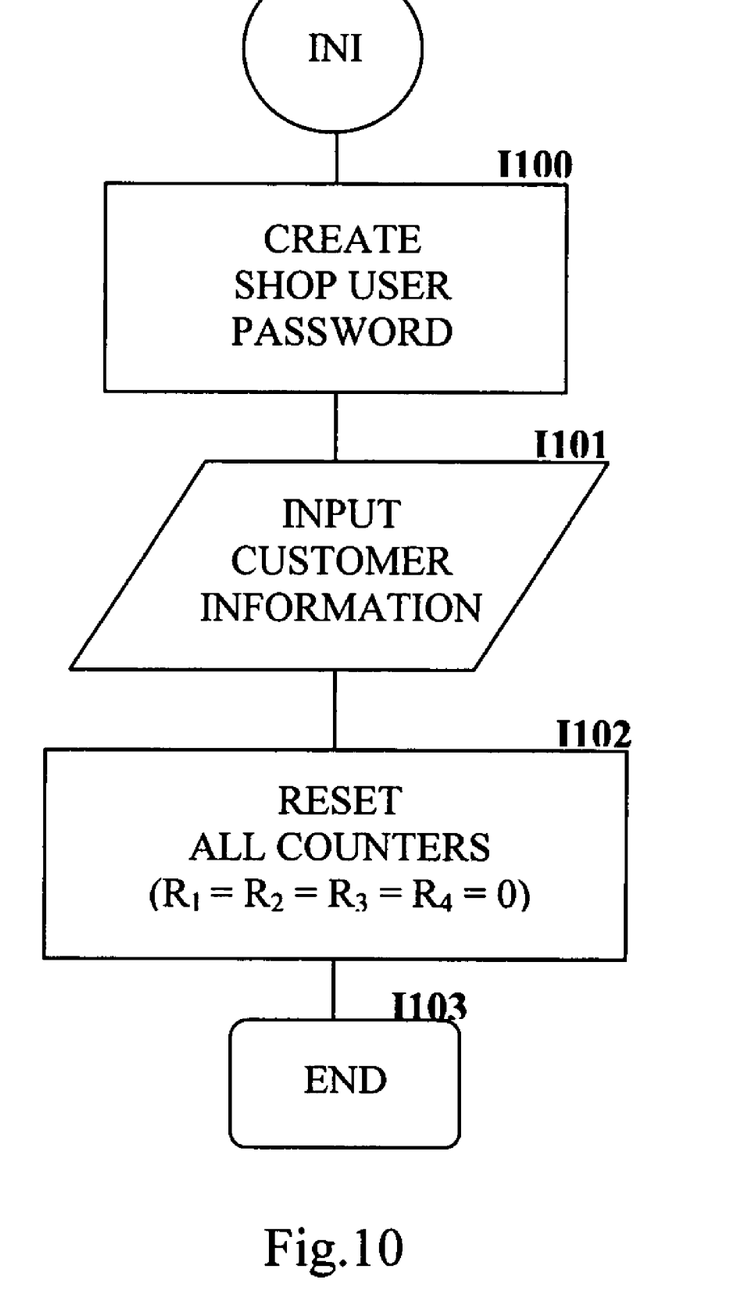
FIG. 10 is an initial setup routine.

Initial setup routine is shown in FIG. 10. The shop user first creates a password at the step I100, which is later used to access the VMM. The shop user inputs the vehicle information at the step I101 such as customer name, vehicle license number, make, model, and year of production. User information and password are saved into FLASH memory of the VMM because they are not often updated. After inputting user information, the shop user resets all service counters into zero at the module I102. All counters are stored at the EEPROM since they are frequently referred and updated.

Figure 11:
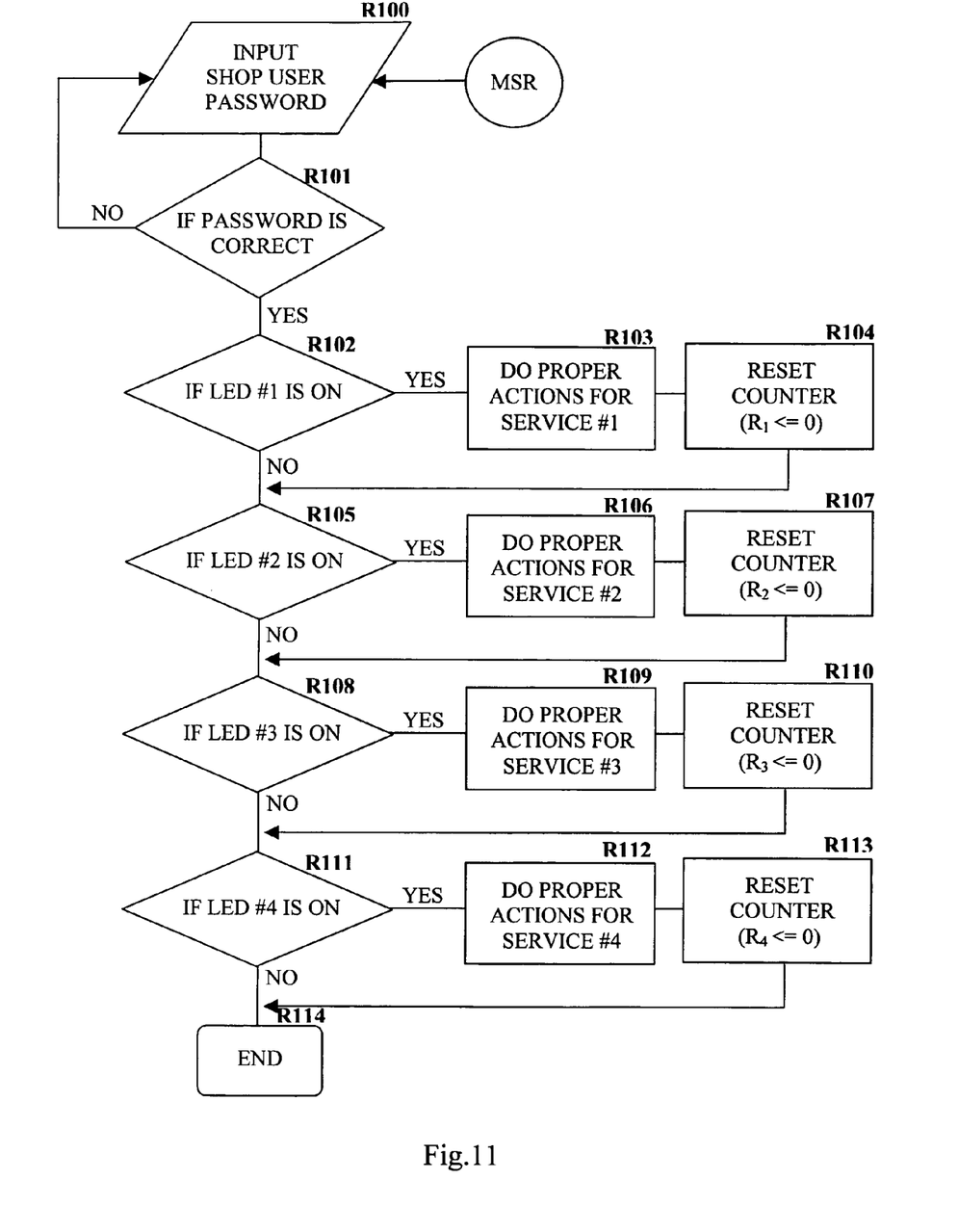
FIG. 11 is a maintenance service routine.

When the customer comes back to the shop that installed the VMM device, the MSR should be executed as depicted in FIG. 11. The shop user first inputs the password to access the VMM device at the step R100. If the password is correct at the junction R101, then it goes to the next module. Otherwise, the user has to input again until it is correct. Once the password checking is done, the shop user has to examine which LED is on to take a proper maintenance service. If the LED #1 is on (R102), the shop worker should change engine oil (R103). After the service is done, the shop user reset the counter, $R_1$ into zero for the next time (R104). If the LED #2 is on (R105), the shop worker should check gear box, differential, and fuel injection (R106). After the service is done, the shop user should reset the counter, $R_2$ to zero for the next time (R107). If the LED #3 is on (R108), the shop worker should change the transmission oil (R109). After the service is done, the shop user should reset the counter, $R_3$ to zero for the next time (R110). If the LED #4 is on (R111), the shop worker should check the radiator (R112). After the service is done, the shop user should reset the counter, $R_4$ to zero for the next time (R113). The reset counters are restored in the EEPROM of the VMM.

Figure 12:
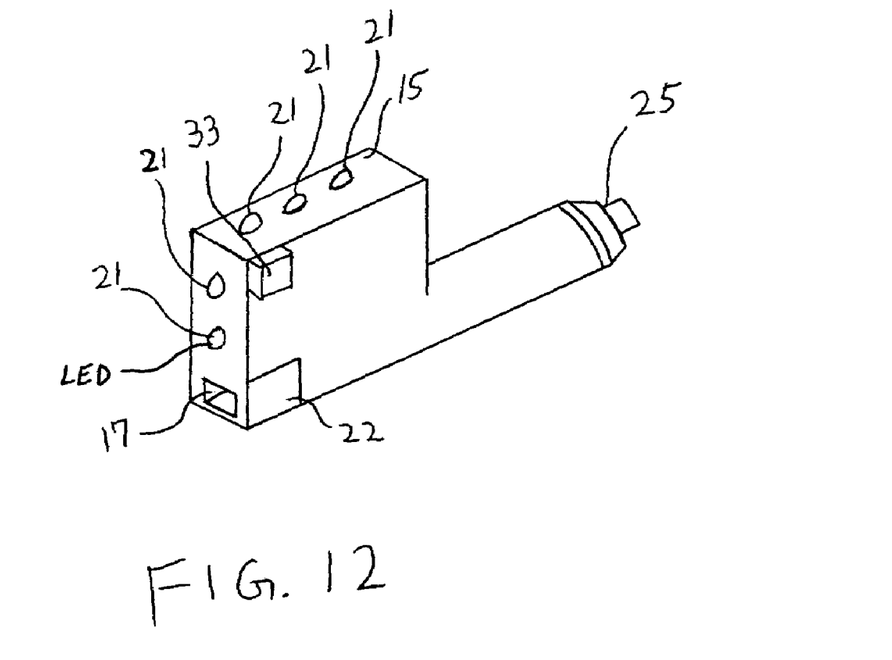
FIG. 12 is a view of an alternative embodiment of the present invention.

In an alternative embodiment shown in FIG. 12, the VMM device, in lieu of a vibration sensor and RF Antenna Unit, the housing 15 has an adapter 25 for connection into the power jack of an automobile. When the vehicle engine starts, the adapter receives signal from the jack and the counter in the microprocessor is triggered. The adapter 25 in this embodiment provides the control signal C0 to the microprocessor. The control signal, C0, which is connected to a reset pin of the microprocessor, is used to initiate the operation of the microprocessor by sensing the proper signal from the power jack when the vehicle is in operation. As such, when a vehicle is in operation, the power jack transmits the proper signal to the adapter, and this in turn activates the signal C0 to an on state. This alternative embodiment will not function properly with some vehicles in that the power jack will continually provide the proper signal even when the vehicle is not in operation. For such vehicles, this embodiment can have the vibration sensor and the RF antenna unit also connected to the microprocessor to work in conjunction with the adapter for determining operation of the vehicle. With the RF antenna unit and vibration sensor working in conjunction with the adapter, the signal C0 will be activated to an on state and the counters of the processing unit will operate only when the adapter, RF antenna unit, and the vibration sensor are all activated by receiving the proper signals.

While a preferred embodiment of the invention has been described and illustrated for purposes of clarity and example, it should be understood that many changes, substitutions and modifications to the described embodiment will be apparent to those having skill in the art in light of the foregoing disclosure without departing from the scope and spirit of the present invention which is defined by the claim which will follow.

The invention claimed is:

1. A maintenance monitor device for use with a vehicle having a power jack, said device comprising:
   a housing having a plurality of light emitting diodes formed thereon;
   a processing unit for processing a predetermined set of functions;
   a memory connected with the processing unit for storing information regarding operation of the vehicle and for storing information regarding a plurality of maintenance service requirements;
   a display unit disposed on said housing connected to the microprocessor;
   an adapter formed on said housing unit connected to the processing unit; and,
   said adapter formed to connect to the power jack of said vehicle.

2. A maintenance monitor device as described in claim 1 further comprising a communication port for connection to a computer.

3. A maintenance monitor device as described in claim 1 wherein said memory stores a predetermined number of counters, each counter corresponding to a predetermined maintenance service requirement to be monitored by said device;
   whereby said counters update and save data in the memory when the vehicle is in operation.

4. A maintenance monitor device as described in claim 1 wherein said display unit comprises a plurality of light emitting diodes formed on said housing corresponding to said predetermined number of counters stored in said memory.

5. A maintenance monitor device as described in claim 4 wherein when one of the counters in the memory hits a predetermined number that is related to a specific maintenance service requirement, the processing unit transmits a signal to activate a corresponding appropriate one of said plurality of light emitting diodes.

6. A maintenance monitor device as described in claim 1 further comprising a vibration sensor and a radio frequency antenna unit disposed on the housing; said vibration sensor and radio frequency antenna unit connected to the processing unit.

7. A maintenance monitor device for use with a vehicle, said device comprising:
   a housing having a display unit formed thereon;
   a power supply unit disposed in said housing;
   a processing unit for processing a predetermined set of functions;
   a display unit disposed on said housing connected to the microprocessor;
   a memory connected with the processing unit for storing information regarding operation of the vehicle and for storing information regarding a plurality of maintenance service requirements; and,
   a vibration sensor disposed on said housing unit connected to the processing unit.

8. A maintenance monitor device as described in claim 7 further comprising a communication port for connection to a computer.

9. A maintenance monitor device as described in claim 7 wherein said memory stores a predetermined number of counters, each counter corresponding to a predetermined maintenance service requirement to be monitored by said device;
   whereby said counters update and save data in the memory when the vehicle is in operation.

10. A maintenance monitor device as described in claim 7 wherein said display unit comprises a plurality of light emitting diodes formed on said housing corresponding to said predetermined number of counters stored in said memory.

11. A maintenance monitor device as described in claim 10 wherein when one of the counters in the memory hits a predetermined number that is related to a specific maintenance service requirement, the processing unit transmits a signal to activate a corresponding appropriate one of said plurality of light emitting diodes formed on the housing.

12. A maintenance monitor device as described in claim 9 further comprising a radio frequency antenna unit connected to the processing unit.

13. A maintenance monitor device for use with a computer and with a vehicle having a power jack, said device comprising:
   a housing having a plurality of light emitting diodes formed thereon;
   a processing unit for processing a predetermined set of functions;
   a memory connected with the processing unit for storing information regarding operation of the vehicle and for storing information regarding a plurality of maintenance service requirements;
   a display unit disposed on said housing connected to the microprocessor;
   a communication port formed on said housing for connection to said computer;
   an adapter formed on said housing unit connected to the processing unit;
   said adapter formed to connect to the power jack of said vehicle;
   wherein said memory stores a predetermined number of counters, each counter corresponding to a predetermined maintenance service requirement to be monitored by said device; and,
   whereby said counters update and save data in the memory when the vehicle is in operation.

14. A maintenance monitor device as described in claim 13 wherein said display unit comprises a plurality of light emitting diodes formed on said housing corresponding to said predetermined number of counters stored in said memory.

15. A maintenance monitor device as described in claim 14 wherein when one of the counters in the memory hits a predetermined number that is related to a specific maintenance service requirement, the processing unit transmits a signal to activate a corresponding appropriate one of said plurality of light emitting diodes.

16. A maintenance monitor device as described in claim 13 further comprising a vibration sensor and a radio frequency antenna unit disposed on the housing; said vibration sensor and radio frequency antenna unit connected to the processing unit.

* * * * *